United States Patent
Miller

(10) Patent No.: US 6,921,779 B2
(45) Date of Patent: Jul. 26, 2005

(54) BLOWING AGENT ENHANCERS FOR POLYURETHANE FOAM PRODUCTION

(75) Inventor: John William Miller, Allentown, PA (US)

(73) Assignee: Air Products and Chemicals, Inc., Allentown, PA (US)

(*) Notice: Subject to any disclaimer, the term of this patent is extended or adjusted under 35 U.S.C. 154(b) by 0 days.

(21) Appl. No.: 10/700,163

(22) Filed: Nov. 3, 2003

(65) Prior Publication Data

US 2005/0070618 A1 Mar. 31, 2005

Related U.S. Application Data

(63) Continuation-in-part of application No. 10/672,363, filed on Sep. 26, 2003.

(51) Int. Cl.[7] .................................................. C08J 9/14
(52) U.S. Cl. ........................... 521/114; 252/67; 252/68; 252/69; 252/364; 516/12; 521/112; 521/116; 521/117; 521/131; 521/170; 521/174
(58) Field of Search ................................ 521/112, 114, 521/116, 117, 131, 170, 174; 252/67, 68, 69, 304; 516/12

(56) References Cited

U.S. PATENT DOCUMENTS

| | | |
|---|---|---|
| 3,875,086 A * | 4/1975 | Ramey et al. ............... 521/160 |
| 4,608,432 A | 8/1986 | Magnus et al. |
| 4,722,803 A | 2/1988 | Magnus et al. |
| 5,109,031 A | 4/1992 | Snider |
| 5,114,755 A | 5/1992 | Canaday et al. |
| 5,189,068 A * | 2/1993 | Boehme et al. ............... 521/51 |
| 5,464,562 A | 11/1995 | Patterson |
| 5,484,817 A | 1/1996 | Patterson |
| 5,488,071 A | 1/1996 | Patterson |
| 5,624,969 A | 4/1997 | Seifert et al. |
| 5,684,092 A | 11/1997 | Seifert et al. |
| 5,786,400 A | 7/1998 | Brock et al. |
| 5,876,802 A * | 3/1999 | Brunnemann et al. ...... 427/409 |
| 6,034,145 A | 3/2000 | Cornet et al. |
| 6,086,788 A | 7/2000 | Bogdan et al. |
| 6,262,136 B1 | 7/2001 | Dobransky |
| 2003/0078312 A1 | 4/2003 | Hibino et al. |

FOREIGN PATENT DOCUMENTS

WO    WO 02/26913 A2    4/2002

* cited by examiner

Primary Examiner—John M. Cooney, Jr.
(74) Attorney, Agent, or Firm—Michael Leach

(57) ABSTRACT

Rigid polyurethane blowing agent enhancers, methods for using them, and the products produced by these methods are disclosed. The enhancers are low molecular weight alcohols and/or ethers that assist the action of blowing agents comprising a hydrohalocarbon compound.

20 Claims, No Drawings

BLOWING AGENT ENHANCERS FOR POLYURETHANE FOAM PRODUCTION

CROSS-REFERENCE TO RELATED APPLICATIONS

This application is a continuation-in-part of application Ser. No. 10/672,363 filed 26 Sep. 2003.

BACKGROUND OF THE INVENTION

The present invention relates to compositions and processes for making polyurethane foams. More particularly, it relates to compositions and processes incorporating compounds for enhancing the effectiveness of hydrohalocarbon blowing agents in making polyurethane foams.

The manufacture of rigid polyurethane foams has been significantly impacted by restrictions on the use of certain prior art blowing agents, which may be environmentally harmful. Although new, more environmentally acceptable blowing agents have come into use (typically hydrohalocarbons), these are generally not as effective as those commonly used previously and there is therefore a continuing need for enhancements in the process of making rigid polyurethane foams and/or in the properties of the foams themselves. The present invention addresses that need with compounds which are believed to enhance the effectiveness of blowing agents used in making rigid polyurethane foams.

BRIEF SUMMARY OF THE INVENTION

In one aspect, the invention is a composition for producing a polyurethane foam. The composition comprises a polyol, a polyisocyanate, a blowing agent comprising a hydrohalocarbon, and a blowing agent enhancer comprising at least one compound having a molecular weight less than about 500 g/mol and a molecular formula of RO—(CH$_2$CHR"O)$_n$—R'; wherein:

R is selected from the group consisting of a C1–C10 aliphatic group, a C5–C10 cycloaliphatic group, a C7–C10 araliphatic group, a C1–C10 aliphatic group comprising a nitrogen atom or oxygen atom, a C5–C10 cycloaliphatic group comprising a nitrogen atom or oxygen atom, and a C7–C10 araliphatic group comprising a nitrogen atom or oxygen atom;

R' is selected from the group consisting of R, hydrogen, acetyl, propionyl, and butyryl, provided that the at least one compound has no more than one hydroxyl group per molecule;

R" is hydrogen or a C1–C5 alkyl group; and n is an integer greater than or equal to 1.

In another aspect, the invention is a method of making a polyurethane foam. The method comprises combining a polyol and a polyisocyanate in the presence of 1) a blowing agent comprising a hydrohalocarbon and 2) a blowing agent enhancer comprising at least one compound having a molecular weight less than about 500 g/mol and a molecular formula of RO—(CH$_2$CHR"O)$_n$—R'; wherein:

R is selected from the group consisting of a C1–C10 aliphatic group, a C5–C10 cycloaliphatic group, a C7–C10 araliphatic group, a C1–C10 aliphatic group comprising a nitrogen atom or oxygen atom, a C5–C10 cycloaliphatic group comprising a nitrogen atom or oxygen atom, and a C7–C10 araliphatic group comprising a nitrogen atom or oxygen atom;

R' is selected from the group consisting of R, hydrogen, acetyl, propionyl, and butyryl, provided that the at least one compound has no more than one hydroxyl group per molecule;

R" is hydrogen or a C1–C5 alkyl group; and n is an integer greater than or equal to 1.

In yet another aspect, the invention is a composition for producing a polyurethane foam. The composition comprises a polyol, a polyisocyanate, a blowing agent comprising a hydrohalocarbon, and a blowing agent enhancer comprising at least one compound having a molecular weight less than about 500 g/mol and a molecular formula ROH, wherein:

R is selected from the group consisting of a C1–C10 aliphatic group, a C5–C10 cycloaliphatic group, a C7–C10 araliphatic group, a C1–C10 aliphatic group comprising a nitrogen atom or oxygen atom, a C5–C10 cycloaliphatic group comprising a nitrogen atom or oxygen atom, and a C7–C10 araliphatic group comprising a nitrogen atom or oxygen atom, provided that the at least one compound comprises only one hydroxyl group per molecule.

In a further aspect, the invention is a polyurethane composition comprising a product of a reaction between a polyol and a polyisocyanate. The reaction takes place in the presence of 1) a blowing agent comprising a hydrohalocarbon and 2) a blowing agent enhancer comprising at least one compound having a molecular weight less than about 500 g/mol and a molecular formula of RO—(CH$_2$CHR"O)$_n$—R'; wherein:

R is selected from the group consisting of a C1–C10 aliphatic group, a C5–C10 cycloaliphatic group, a C7–C10 araliphatic group, a C1–C10 aliphatic group comprising a nitrogen atom or oxygen atom, a C5–C10 cycloaliphatic group comprising a nitrogen atom or oxygen atom, and a C7–C10 araliphatic group comprising a nitrogen atom or oxygen atom;

R' is selected from the group consisting of R, hydrogen, acetyl, propionyl, and butyryl, provided that the at least one compound has no more than one hydroxyl group per molecule;

R" is hydrogen or a C1–C5 alkyl group; and n is an integer greater than or equal to 1.

In a still further aspect, the invention is a composition for producing a polyurethane foam. The composition comprises 1) one but not both of a polyol and a polyisocyanate, 2) a blowing agent comprising a hydrohalocarbon and 3) a blowing agent enhancer comprising at least one compound having a molecular weight less than about 500 g/mol and a molecular formula of RO—(CH$_2$CHR"O)$_n$—R'; wherein:

R is selected from the group consisting of a C1–C10 aliphatic group, a C5–C10 cycloaliphatic group, a C7–C10 araliphatic group, a C1–C10 aliphatic group comprising a nitrogen atom or oxygen atom, a C5–C10 cycloaliphatic group comprising a nitrogen atom or oxygen atom, and a C7–C10 araliphatic group comprising a nitrogen atom or oxygen atom;

R' is selected from the group consisting of R, hydrogen, acetyl, propionyl, and butyryl, provided that the at least one compound has no more than one hydroxyl group per molecule;

R" is hydrogen or a C1–C5 alkyl group; and n is an integer greater than or equal to 1.

Another embodiment of the invention is a combination of blowing agent comprising a hydrohalocarbon and blowing agent enhancer, as otherwise described herein. Such combination may have advantages as a commercially saleable product, useful to those making polyurethane foams.

Yet another embodiment of the invention is a combination of silicone-based surfactant and blowing agent enhancer, as otherwise described herein. Such combination may have advantages as a commercially saleable product, useful to those making polyurethane foams.

DETAILED DESCRIPTION OF THE INVENTION

The present invention involves the use of low molecular weight ethers and alcohols as blowing agent enhancers for improving the efficiency of hydrohalocarbon blowing agents in the preparation of rigid polyurethane and/or polyisocyanurate foam. As used herein, the term "polyurethane" is intended to mean polyurethane and/or polyisocyanurate, as is understood in the art. Thus a rigid polyurethane foam can be a rigid polyurethane and/or polyisocyanurate foam. The term "hydrohalocarbon" is used herein to mean a compound consisting of carbon, hydrogen, and one or both of fluorine and chlorine, and no other elements.

In accordance with the invention, enhancers are provided that are useful in the reaction of a polyisocyanate and a polyol in the presence of a blowing agent comprising a hydrohalocarbon. Typically, the reaction is performed in the presence of a urethane catalyst, and typically in the presence of a surfactant. The enhancer comprises a low molecular weight alcohol or ether, for example di(ethylene glycol) methyl ether.

The process according to the invention can easily be carried out by conventional means for making rigid polyurethane foam, excepting that the general preparation of rigid polyurethane foam using a hydrohalocarbon blowing agent, preferably a C1–C4 hydrofluorocarbon, is carried out using the blowing agent enhancer according to the invention to improve the blowing agent efficiency.

Polyisocyanate

Rigid polyurethane products made in accordance with the invention may be prepared using any suitable organic polyisocyanates well known in the art for making rigid polyurethane foam including, for example, hexamethylene diisocyanates, isophorone diisocyanates, phenylene diisocyanates, toluene diisocyanates (TDI) and 4,4'-diphenylmethane diisocyanates (MDI). Especially suitable are mixtures of diisocyanates known commercially as "crude MDI", marketed as PAPI by Dow Chemical, which contain about 60% of 4,4'-diphenylmethane diisocyanates along with other isomeric and analogous higher polyisocyanates. Other suitable isocyanates are the 2,4- and 2,6-TDI's individually or together as their commercially available mixtures. Also suitable are "prepolymers" of these polyisocyanates comprising a partially pre-reacted mixture of a polyisocyanate and a polyether or polyester polyol. Typically, the above polyisocyanates are used in an amount relative to the polyol to establish an isocyanate index in the range of 80 to 400.

Polyol

Suitable polyols are those typically used in the art for making rigid polyurethane foam, including for example polyalkylene ether and polyester polyols. Polyalkylene ether polyols include poly(ethylene oxide) and poly(propylene oxide) polymers and copolymers with terminal hydroxyl groups derived from polyhydric compounds, for example diols and/or triols. Such diols and triols include, as nonlimiting examples, ethylene glycol, propylene glycol, 1,3-butanediol, 1,4-butanediol, 1,6-hexanediol, neopentyl glycol, diethylene glycol, dipropylene glycol, pentaerythritol, glycerol, diglycerol, trimethylol propane, sugars such as sucrose, and other low molecular weight polyols. Also useful are amine polyether polyols which can be prepared by reacting an amine, such ethylenediamine, diethylenetriamine, tolylenediamine, diphenylmethanediamine, triethanolamine or the like, with ethylene oxide or propylene oxide.

In the practice of this invention, a single high molecular weight polyether polyol such as described above may be used. Also, mixtures of such high molecular weight polyether polyols, for example mixtures of different multifunctional materials and/or of compounds having different molecular weights or different chemical compositions, may be used. Useful polyester polyols include those produced by reacting a dicarboxylic acid with an excess of a diol, for example, adipic acid or phthalic acid anhydride with ethylene glycol or butanediol, or reacting a lactone such as caprolactone with an excess of a diol such as propylene glycol.

Blowing Agent

The hydrohalocarbon blowing agents used in the present invention for making rigid foams include, as nonlimiting examples, HCFC (hydrochlorofluorocarbon) compounds, HFC (hydrofluorocarbon) compounds, and mixtures of these. Hydrochlorofluorocarbon compounds comprise at least one atom of each of hydrogen, chlorine, and fluorine per molecule. Hydrofluorocarbon compounds comprise at least one atom of each of hydrogen and fluorine per molecule, and no chlorine atoms. Such hydrohalocarbon blowing agents are typically used at 5 to 45 pphp (parts per hundred parts polyol), preferably 10 to 25 pphp.

Nonlimiting examples of suitable HCFCs include HCFC-123, HCFC-141b, HCFC-22, HCFC-142b, and mixtures of any of these. Nonlimiting examples of suitable HFC compounds include HFC-134a, HFC-245fa, HFC-245ca, HFC-236ea, HFC-365mfc, and mixtures of any of these. Preferred blowing agents include HCFC-141b, HFC-134a, HFC-245fa, and mixtures of two or more of these. More preferred are third generation C1–C4 HFC blowing agents with a molecular weight of 50 to 170 g/mole, a boiling point of −60 to 50 C and preferably an Ozone Depletion Potential (ODP) of <0.10, ODP as described by: Synthesis of the Reports of the Ozone Scientific Assessment Panel, Environmental Effect Assessment Panel Technology and Economic Assessment Panel, prepared by the Assessment Chairs for the Parties to the Montreal Protocol, November, 1991. HFCs meeting these criteria include HFC-134a, HFC-236ea, HFC-365mfc and most preferably HFC-245fa. Mixtures of these may also be used. Water may be included in the formulation at 0 to 4 pphp (parts per hundred parts of polyol). Other blowing agents which may optionally be used in combination with HFC blowing agents according to the invention include HCFCs, CFCs (chlorofluorocarbons), hydrocarbons such as pentanes, and the like. In one embodiment of the invention, the blowing agent consists essentially of one or more hydrohalocarbons comprising at least one fluorine atom per molecule, either alone or in combination with one or more CFC.

Blowing Agent Enhancer

Blowing agent enhancers according to the invention include compounds having a molecular weight less than about 500 g/mol and a molecular formula according to Structure I:

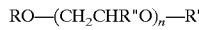
$$RO—(CH_2CHR"O)_n—R' \qquad I$$

wherein R is selected from the group consisting of a C1–C10 aliphatic group, a C5–C10 cycloaliphatic group, a C7–C10 araliphatic group, a C1–C10 aliphatic group comprising a nitrogen atom or oxygen atom, a C5C10 cycloaliphatic group comprising a nitrogen atom or oxygen atom, and a C7–C10 araliphatic group comprising a nitrogen atom or oxygen atom; R' is R, hydrogen, acetyl, propionyl, or butyryl, provided that the at least one compound has no more than one hydroxyl group per molecule; R" is hydrogen or C1–C5 alkyl group; and n is an integer greater than or equal to 1. Typically, n is between 1 and 7, inclusive. Mixtures of compounds according to Structure I may also be used.

Suitable C1–C5 alkyl groups useful for R" include methyl, ethyl, n-propyl, isopropyl, n-butyl, 2-butyl, isobutyl, n-pentyl, 2-methylbutyl, and 3-methylbutyl. Suitable C1–C10 aliphatic groups comprising a nitrogen atom or oxygen atom, and C5–C10 cycloaliphatic groups comprising a nitrogen atom or oxygen atom, include groups wherein a nitrogen atom is incorporated in the form of an amine group and groups where an oxygen atom is incorporated as an ether group, a hydroxyl group, or a carbonyl group. Suitable C7–C10 araliphatic groups comprising a nitrogen atom or oxygen atom include groups wherein a nitrogen atom is incorporated in the form of an amine group or as a member of a heterocyclic ring, and groups where an oxygen atom is incorporated as an ether group, a hydroxyl group, a carbonyl group, or as a member of a heterocyclic ring.

Exemplary compounds according to Structure I include those with two terminal ether groups, compounds with one terminal ether group and one terminal hydroxyl group, and acetyl, propionyl, or butyryl esters of the latter compounds. Preferred enhancers comprise oxyethylene —($CH_2CH_2O$)— and/or oxypropylene —($CH_2CH(CH_3)O$)— groups.

Blowing agent enhancers according to Structure I containing two terminal ether groups include, in one exemplary embodiment, dipropylene glycol dimethyl ether.

Blowing agent enhancers according to Structure I containing one terminal ether group and one terminal hydroxyl group include, for example, ethylene glycol monomethyl ether, ethylene glycol monobutyl ether, ethylene glycol phenyl ether, dipropylene glycol monomethyl ether, dipropylene glycol monopropyl ether, dipropylene glycol monobutyl ether, tripropylene glycol monopropyl ether, and tripropylene glycol monobutyl ether.

Particularly useful are propylene glycol monomethyl ether, propylene glycol monopropyl ether and propylene glycol monobutyl ether. One preferred blowing agent enhancer is diethylene glycol monomethyl ether.

Blowing agent enhancers according to Structure I containing one terminal ether group and a terminal ester group include acetyl, propionyl, or butyryl esters of compounds containing one terminal ether group and a terminal hydroxyl group, for example propylene glycol monomethyl ether acetate.

Suitable blowing agent enhancers according to the invention also include compounds having a molecular weight less than about 500 g/mol and a molecular formula ROH, wherein R is as defined above. Suitable exemplary compounds in this category include methanol, ethanol, and any isomer of propanol, butanol, pentanol, hexanol, heptanol, octanol, nonanol, and decanol.

Mixtures of any of any of these with any of the enhancers represented by Structure I may also be used. Any amount of enhancer may be used, depending upon the desired properties of the resultant foam. Typically, however, the blowing agent enhancer, or mixture of blowing agent enhancers, constitutes at least 2 pphp of the composition, typically at least 4 pphp, and even more typically at least 5 pphp. Typically, it constitutes at most 12 pphp, more typically at most 7 pphp, and even more typically at most 6 pphp.

A useful, commercial aspect of the invention would be a composition comprising a hydrohalocarbon blowing agent and a blowing agent enhancer. Such composition may comprise 60 to 95 wt % blowing agent and 40 to 5 wt % blowing agent enhancer, preferably 75 to 90 wt % blowing agent and 25 to 10 wt % blowing agent enhancer.

Catalyst

A catalyst may be used to promote the reactions forming polyurethane foams according to the invention. The catalyst composition may be any catalyst well known in the urethane art such as tertiary amines, organotin compounds, and carboxylate urethane catalysts (gelling and/or blowing). Typical examples of useful catalysts are amine catalysts such as triethylenediamine, dimethylcyclohexylamine, tetramethylhexanediamine, bis(dimethylaminoethyl) ether, tri(dimethylaminopropyl)hexahydrotriazine, 1-isobutyl-2-methylimidazole, 1,2-dimethylimidazole, dimethylaminoethanol, diethylaminoethanol, pentamethyldiethylenetriamine, pentamethyldipropylenetriamine, methylmorpholine, ethylmorpholine, quaternary ammonium salts, salts of an organic acid and tin catalysts such as dibutyltin dilaurate and the like.

A catalytically effective amount of the catalyst composition is used in the polyurethane formulation. More specifically, suitable amounts of the catalyst composition typically ranges from about 0.01 to 10 parts by weight per 100 parts polyol (0.01 to 10 pphp) in the polyurethane formulation, preferably 0.5 to 4 pphp.

Surfactant

A surfactant may be used in polyurethane foam compositions and processes according to the invention. A number of surfactants suitable for use in controlling foam properties in polyurethane production are known in the art. Exemplary surfactants include silicone-based surfactants such as polyether-polysiloxane copolymers including those disclosed in U.S. Pat. No. 5,883,142 to Chojnacki et al. Such surfactants are typically used at 0.5 to 7 pphp, preferably 2.5 to 4 pphp.

Another useful, commercial embodiment of the invention would be a composition comprising a silicone-based surfactant and blowing agent enhancer. Such composition may comprise 10 to 90 wt % silicone-based surfactant and 90 to 10 wt % blowing agent enhancer, preferably 25 to 75 wt % silicone-based surfactant and 75 to 25 wt % blowing agent enhancer.

Other Ingredients

Other typical agents that may be used in the polyurethane rigid foam formulations include flame retardants and chain extenders such as ethylene glycol and butanediol.

EXAMPLES

A typical range of prior art rigid foam formulations (Table 1) having a 1.5–2.5 lb/ft$^3$ (24–40 kg/m$^3$) density (e.g., appliance foam) containing a blowing agent enhancer according to the invention and a third generation blowing agent, for example HFC-245fa, may comprise the following components in parts by weight (pbw):

TABLE 1

General Rigid Foam Formulation

| Component | pbw |
| --- | --- |
| Polyol | 100 |
| Silicone Surfactant | 1–3 |
| Blowing Agent | 20–40 |
| Water | 0–3 |
| Catalyst | 1–3 |
| Polyisocyanate | NCO Index = 80–400 |

As used in Table 1 and hereinafter, the term "NCO Index" means isocyanate index, as that term is commonly used in the polyurethane art. Use of this term in a table of formulations indicates that the appropriate amount of polyisocyanate should be used in order to achieve a formulation having the indicated NCO index.

In the following examples, a specific rigid polyurethane foam formulation (shown in Table 2) was used as a Control formulation for foam production. Blowing agent enhancers were incorporated into formulations as shown in Table 3, and the experimental results from foam production with the formulations of Tables 2 and 3 are compared in Table 4.

TABLE 2

Control Formulation

| Component | pbw |
|---|---|
| Polyol* | 100.0 |
| Silicone Surfactant | 4.0 |
| HFC-245fa | 35.0 |
| Water | 1.3 |
| Amine Catalyst** | 2.3 |
| Polyisocyanate*** | NCO Index = 105 |

*Sucrose-initiated ethylene oxide/propylene oxide copolymer with a hydroxyl number of about 350 to 400.
**A 2:1 wt/wt mixture of Polycat ® 5 and Polycat ® 41, available from Air Products and Chemicals, Inc. of Allentown, PA.
***Polymeric MDI, sold under the name Rubinate ® M by Huntsman Polyurethanes of West Deptford, New Jersey.

TABLE 3

Example Formulation

| Component | pbw |
|---|---|
| Polyol | 100.0 |
| Silicone Surfactant | 4.0 |
| HFC-245fa | 35.0 |
| Water | 1.3 |
| Amine Catalyst | 2.3 |
| Blowing Agent Enhancer | 6.0 |
| Polyisocyanate | NCO Index = 105 |

Example 1

The ingredients in Tables 2 and 3, except for the polymeric MDI, were combined and incubated at 10° C. until the mixtures had equilibrated to temperature. The resin was weighed into a paper cup, the polymeric MDI was added to the cup in an amount such that the isocyanate (NCO) index was 105. The mixture was stirred with a high speed mixer for eight seconds, and the cup with the foaming mass was then placed into an L-mold designed for measuring foam flow and other physical properties. The L-mold was heated to 49° C. and was used for initial screening of blowing agent enhancers. The control formula (Table 2) was used to prepare a reference foam to measure foam flow and foam density for comparison with foams containing a blowing agent enhancer (Table 3).

Foam flow was determined by measuring the % fill of the L mold when a constant amount of foam formulation (475 grams) was introduced into the mold, with a higher % fill indicating better flow for samples of equal mass. In addition to comparing foam low and density, foam from each of the formulas was evaluated to determine k-factor and compression strength. The top 12 inches of the foams were cut into three sections then stored at −30° C. for 72 hours to measure volume change, to verify that there was less than two per cent change, indicating sufficient dimensional stability according to commonly accepted industry standards. The next section of the foam was used to cut a core sample to measure the k-factor or heat flow in a Lasercomp Fox 200 heat low meter.

Table 4 is a summary of foam performance data for a number of blowing agent enhancers according to the invention. For each enhancer, the corresponding % fill in the L-mold and k-factor were recorded.

TABLE 4

Performance of Blowing Agent Enhancers

| ID | Compound | % Fill | K-Factor (W/mK) |
|---|---|---|---|
| 1 | Control (No enhancer) | 92.5 | 0.0206 |
| 2 | Diethylene glycol monomethyl ether | 99.2 | 0.0206 |
| 3 | Tripropylene glycol monobutyl ether | 95.6 | 0.0206 |
| 4 | Propylene glycol monobutyl ether | 97.7 | 0.0209 |
| 5 | Dipropylene glycol monopropyl ether | 94.8 | 0.0212 |
| 6 | Propylene glycol monomethyl ether acetate | 98.0 | 0.0208 |
| 7 | Propylene glycol monomethyl ether | 99.0 | 0.0212 |
| 8 | Ethylene glycol monobutyl ether | 96.1 | 0.0221 |
| 9 | Dipropylene glycol dimethyl ether | 97.2 | 0.0222 |
| 10 | Dipropylene glycol monobutyl ether | 96.1 | 0.0215 |
| 11 | Dipropylene glycol monomethyl ether | 96.7 | 0.0212 |
| 12 | Propylene glycol monopropyl ether | 97.7 | 0.0212 |
| 13 | Ethylene glycol phenyl ether | 95.9 | 0.0215 |
| 14 | Tripropylene glycol monopropyl ether | 95.7 | 0.0216 |

Compared with the control (1), blowing agent enhancers 2–14 all showed improved flow (higher value for % fill), with comparable to only slightly worse (higher numerical value) k factors. The blowing agent enhancer that yielded the best flow and k-factor was (2), or di(ethylene glycol) methyl ether.

Example 2

To further demonstrate the efficacy of di(ethylene glycol) methyl ether for blowing agent reduction, larger scale high-pressure machine evaluations were conducted. The ingredients in Table 3, except for the polymeric MDI, were combined in a five-gallon pressurized day tank and incubated at 26.7° C. until the mixture had equilibrated to temperature. The polymeric MDI was incubated in a separate five gallon pressurized day tank and also incubated to 26.7° C. After the ingredients in both day tanks had been equilibrated, they were mixed together through a high-pressure impingement mix head at 13,790 KPa (2000 psi). This reacting mass was poured into a 200×20×5 cm mold heated to 49° C.

Enough of the foaming mixture was added to the mold to yield panels at multiple densities, including minimum fill. Several over-packed densities were produced to determine the lowest density which passed physical property requirements. The foam panels were removed from the mold after six minutes and aged at 23° C. for 18–24 hours. A 20.3×20.3×2.54 cm (8×8×1 inch) portion was cut from the bottom of the panels and the k-factor was evaluated for each in a Lasercomp Fox 200 heat flow meter. Four samples were cut from the top of the panels 20.3×10.2×5.1 cm (8×4×2 inch) for determining the density at which dimensional stability was achieved.

Table 5 collects foam performance data using di(ethylene glycol) methyl ether at 6 pbw in the formula from Table 3. The objective of this example was to match the density and foam performance of the control while maximizing HFC-245fa reduction. The table clearly shows that the di(ethylene glycol) methyl ether blowing agent enhancer allows for lower HFC-245fa concentrations, with no significant penalties to foam thermal properties and an improvement to the compression strengths. Compression strength values are a measure of the force needed to physically crush the foam until failure. Higher force relates to improved foam mechanical properties, giving the final product (e.g. a refrigerator) structural integrity. Table 5 illustrates that a 19% reduction of HFC-245fa is attainable by use of di(ethylene glycol) methyl ether as a blowing agent enhancer to achieve foams of equivalent k-factor, while maintaining equal or even improved compression strength.

TABLE 5

Reduction of Blowing Agent Use Level

| Formula | Enhancer (pphp) | HFC-245fa (pphp) | Minimum Fill (Density Kg/m$^3$) | K-Factor (W/mK) | Compression Strength (KPa) Perp./Parallel |
|---|---|---|---|---|---|
| 1 | None | 35.2 | 32.84 | 0.0195 | 138/159 |
| 2 | 6.0 | 28.5 | 32.68 | 0.0195 | 165/193 |
| 3 | 6.0 | 28.5 | 32.04 | 0.0198 | 159/200 |
| 4 | 6.0 | 28.5 | 33.00 | 0.0196 | 152/186 |

The foregoing experimental data indicate that, in the production of rigid polyurethane foams using a hydrohalocarbon blowing agent, particularly HFC-245fa, use of blowing agent enhancers according to the invention allows the production of foams with a reduced amount of blowing agent, while retaining at least equal physical properties to a reference foam with a higher level of blowing agent and none of the enhancer. In some cases, compression strength is improved with use of the enhancer.

Although the invention is illustrated and described herein with reference to specific embodiments, the invention is not intended to be limited to the details shown. Rather, it is intended that the scope of the claims that follow includes various modifications that may be made in the details while nevertheless achieving the effects of this invention.

I claim:

1. A composition useful for producing a polyurethane foam, the composition comprising a blowing agent comprising a hydrofluorocarbon, and a blowing agent enhancer comprising at least one compound selected from the group consisting of ethylene glycol monomethyl ether, ethylene glycol monobutyl ether, ethylene glycol phenyl ether, diethylene glycol monomethyl ether, propylene glycol monomethyl ether, propylene glycol monomethyl ether acetate, propylene glycol monoprepyl ether, propylene glycol monobutyl ether, dipropylene glycol dimethyl ether, dipropylene glycol monomethyl ether, dipropylene glycol monobpropyl ether, dipropylene glycol monobutyl ether, tripropylene glycol monopropyl ether, tripropylene glycol monobutyl ether, or a mixture of any of these.

2. The composition of claim 1 which is 60–95 wt % blowing agent and 40–5 wt % blowing agent enhancer, based on blowing agent and blowing agent enhancer.

3. The composition of claim 2 in which the blowing agent comprises HCFC-123, HCFC-141b, HCFC-22, HCFC-142b, HFC-134a, HFC-245fa, HFC-245ca, HFC-236ea, HFC-365mfc, or a mixture of any of these.

4. The composition of claim 2 in which the blowing agent comprises HCFC-141b, HFC-134a, HFC-245fa, or a mixture of any of these.

5. The composition of claim 2 in which the blowing agent comprises HFC-134a, HFC-236ea, HFC-365mfc, HFC-245fa, or a mixture of any of these.

6. The composition of claim 2 in which the blowing agent comprises HFC-245fa.

7. The composition of claim 2 in which the blowing agent enhancer comprises propylene glycol monomethyl ether, propylene glycol monopropyl ether, propylene glycol monobutyl ether, or a mixture of any of these.

8. The composition of claim 2 in which the blowing agent enhancer comprises dipropylene glycol dimethyl ether.

9. The composition of claim 2 in which the blowing agent enhancer comprises diethylene glycol monomethyl ether.

10. The composition of claim 2 which also comprises one or more of a catalyst, a silicone-based surfactant, a flame retardant, a chain extender, or a mixture of any of these.

11. The composition of claim 1 which is 75–90 wt % blowing agent and 25–10 wt % blowing agent enhancer, based on blowing agent and blowing agent enhancer, the blowing agent comprising HCFC-123, HCFC-141b, HCFC-22, HCFC-142b, HFC-134a, HFC-245fa, HFC-245ca, HFC-236ea, HFC-365mfc, or a mixture of any of these, and the blowing agent enhancer comprising propylene glycol monomethyl ether, propylene glycol monopropyl ether, propylene glycol monobutyl ether, dipropylene glycol dimethyl ether, diethylene glycol monomethyl ether, or a mixture of any of these.

12. A composition useful for producing a polyurethane foam, the composition comprising a silicone-based surfactant, and a blowing agent enhancer comprising at least one compound selected from the group consisting of ethylene glycol monomethyl ether, ethylene glycol monobutyl ether, ethylene glycol phenyl ether, diethylene glycol monomethyl ether, propylene glycol monomethyl ether, propylene glycol monomethyl ether acetate, propylene glycol monopropyl ether, propylene glycol monobutyl ether, dipropylene glycol dimethyl ether, dipropylene glycol monomethyl ether, dipropylene glycol monopropyl ether, dipropylene glycol monobutyl ether, tripropylene glycol monopropyl ether, tnpropylene glycol monobulyl ether, or a mixture of any of these.

13. The composition of claim 12 which is 10–90 wt % silicone-based surfactant and 90–10 wt % blowing agent enhancer, based on silicone-based surfactant and blowing agent enhancer.

14. The composition of claim 13 in which the silicone-based surfactant is a polyether-polysiloxane surfactant.

15. The composition of claim 13 in which the blowing agent enhancer comprises propylene glycol monomethyl ether, propylene glycol monopropyl ether, propylene glycol monobutyl ether, or a mixture of any of these.

16. The composition of claim 13 in which the blowing agent enhancer comprises dipropylene glycol dimethyl ether.

17. The composition of claim 13 in which the blowing agent enhancer comprises diethylene glycol monomethyl ether.

18. The composition of claim 13 which also comprises one or more of a catalyst, a blowing agent which is a hydrohalocarbon, a flame retardant, a chain extender, or a mixture of any of these.

19. The composition of claim 12 which is 25–75 wt % polyether-polysiloxane surfactant and 75–25 wt % blowing agent enhancer, based on surfactant and blowing agent enhancer, the blowing agent enhancer comprising propylene glycol monomethyl ether, propylene glycol monopropyl ether, propylene glycol monobutyl ether, dipropylene glycol dimethyl ether, diethylene glycol monomethyl ether, or a mixture of any of these.

20. The composition of claim 19 further comprising a blowing agent comprising HCFC-123, HCFC-141b, HCFC-22, HCFC-142b, HFC-134a, HFC-245fa, HFC-245ca, HFC-236ea, HFC-365mfc, or a mixture of any of these.

* * * * *